US006223859B1

(12) United States Patent
Lindenthal

(10) Patent No.: US 6,223,859 B1
(45) Date of Patent: May 1, 2001

(54) LUBRICANT FEEDING SYSTEM FOR SHAFT AND HUB PROFILE ASSEMBLIES WITH AXIAL LONGITUDINAL DISPLACEMENT CAPACITY

(75) Inventor: Hans Lindenthal, Heidenheim (DE)

(73) Assignee: Voith Turbo GmbH & Co. KG, Heidenheim (DE)

(*) Notice: Subject to any disclaimer, the term of this patent is extended or adjusted under 35 U.S.C. 154(b) by 0 days.

(21) Appl. No.: 09/297,758

(22) PCT Filed: Sep. 1, 1998

(86) PCT No.: PCT/EP98/05530

§ 371 Date: Jun. 21, 1999

§ 102(e) Date: Jun. 21, 1999

(87) PCT Pub. No.: WO99/13261

PCT Pub. Date: Mar. 18, 1999

(30) Foreign Application Priority Data

Sep. 5, 1997 (DE) ............................... 197 38 896

(51) Int. Cl.[7] ............... F01M 1/00; F16N 27/00; F16K 15/14; F16C 33/16
(52) U.S. Cl. ............... 184/11.2; 184/7.4; 137/854; 384/399
(58) Field of Search ............... 184/11.2, 7.4; 384/399, 466; 91/471; 137/854

(56) References Cited

U.S. PATENT DOCUMENTS 2,204,878 * 6/1940 Anderson ........................ 184/7.4
3,921,760 * 11/1975 Brownrigg ....................... 184/7.4
3,954,121 * 5/1976 Kardos ............................ 137/854
4,105,094 * 8/1978 Callahan .......................... 184/7
4,472,111 * 9/1984 Yamatani .......................... 417/1
4,537,284 * 8/1985 Breisinger et al. ............... 184/7.4
5,022,769 * 6/1991 Jacobs et al. .................... 384/118
5,147,016 * 9/1992 Antila ............................. 184/7.4
5,738,190 * 4/1998 Deferme ......................... 137/854 X

FOREIGN PATENT DOCUMENTS

| 108923 | 3/1900 | (DE) . |
| 1 992 804 | 3/1968 | (DE) . |
| 4023835 A1 | 1/1992 | (DE) ............... G01F/3/20 |
| 0525498 A2 | 2/1993 | (EP) ............... B25D/17/26 |

* cited by examiner

Primary Examiner—Charles A Marmor
Assistant Examiner—Roger Pang
(74) Attorney, Agent, or Firm—Randall J. Knuth

(57) ABSTRACT

A lubricant feeding system for shaft and hub profile assemblies that can move longitudinally along an axis. A first exterior assembly member (e.g., shaft or hub) encloses at least partly a second interior member (e.g., hub or shaft) along the circumference. At least one distributing channel, extending circumferentially over at least part of the inner circumference, is provided in the region of the profile base. This distributing channel is coupled with at least one lubricant feeding channel extending towards the external circumference of the assembly exterior member The invention includes a distributing member extending circumferentially over the length of the distributing channel, splits the distributing channel into a first partial area located radially outward and a second partial area located radially inward. The distributing member and the distributing channel are designed to form, when they co-operate, a plurality of valve areas between the first and the second partial of the distributing channel.

32 Claims, 10 Drawing Sheets

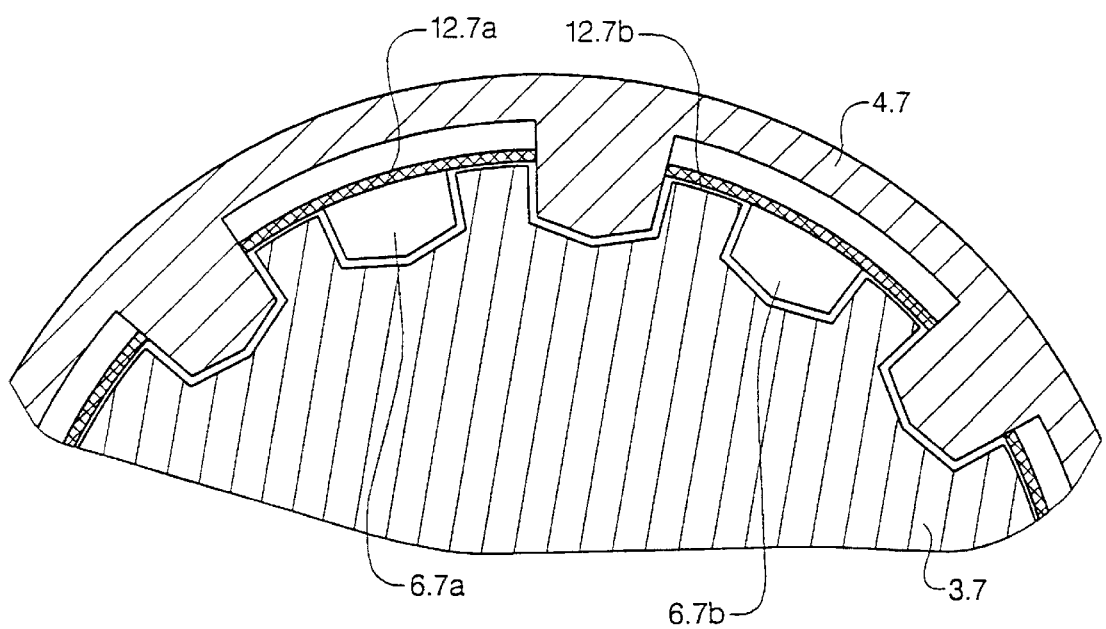

LUBRICANT FEEDING SYSTEM FOR SHAFT AND HUB PROFILE ASSEMBLIES WITH AXIAL LONGITUDINAL DISPLACEMENT CAPACITY

BACKGROUND OF THE INVENTION

1. Field of the Invention

The invention is relative to a lubricant supply system for profile connections such as unions, assemblies, and linkages of shaft and hub with the ability to move axially and longitudinally, specifically with the features of the generic part of claim 1.

2. Description of the Related Art

Positive form-locking connections for transferring torque in the form of profile connections which additionally permit the possibility of a relative movement of shaft and hub in the axial direction are known in a plurality of designs for various applications. Voith publication G 1 121 4.85 discloses a compact drive shaft with axial, longitudinal compensation in the middle area in the form of a profile connection. A stop is associated with the axial, longitudinal compensation for limiting the axial movement. In order to assure the realization of the operation and to keep down wear, it is necessary that the profile connection be lubricated over the entire width to a sufficient degree. It is customary to associate appropriate lubricating devices with the hub parts of the profile connection, which lubricating devices are coupled to a lubricant supply conduit in a profile groove worked into the inner circumference of the hub part. The profile groove runs in the circumferential direction of the hub part, that is, in the direction of rotation or counter to the direction of rotation. The lubricant should then be distributed essentially in the distributor groove arranged on the inner circumference of the hub part and pass into the space realized by the groove worked into the projecting profiles and consequently forming an intermediate space which cannot be bridged. The lubrication again passes into the intermediate spaces between the profile parts of shaft and hub contacting each other (recesses and projections), which intermediate spaces are conditioned by the play existing during the meshing of the is profiles of the individual components of the profile connections, so that the lubricant can be distributed essentially over the entire axial extent of the profile connection.

However, such a design has the significant disadvantage that in the case of profile connections with a large diameter, in order to assure a sufficient supply of lubricant, a correspondingly great amount of lubricant is required. In order to bring in the large amounts of lubricant into the distributor groove and distribute it over the axial extent of the profile connection and/or the entire extent in axial direction of the individual components of the profile connection upon axial and longitudinal movement, a certain time is required for this which, results in standstill times in work machines driven by a drive train with integrated profile connection.

Another significant disadvantage is the fact that in order to realize a lubrication which is as uniform and complete as possible, which requires a large amount of lubricant, an increasing contamination of the system must be accepted at the same time. The operating unit has no influence on the lubrication itself except in the immediate area of the arrangement of the lubricant supply conduits. Thus, there is the possibility that in spite of an elevated pressure of lubricant, since the excess lubricant exits out of the profile connection upon axial, longitudinal movement, no complete lubrication is performed.

The invention is therefore based on the problem of further developing a profile connection with the ability to move axially and longitudinally of the initially cited type in such a manner that the cited disadvantages are avoided. In particular, the required amount of lubricant should be significantly reduced and the required time intervals between the individual lubricant supply cycles should also be made longer. Moreover, the lubricant supply system should be distinguished by a simple design to realize as complete and uniform a lubrication as possible of the individual components of the profile connection of shaft and hub. The lubrication should take place in an obligatory manner and not be a function of the number of lubricant supply conduits connecting the outer circumference of the hub to the distributor groove.

SUMMARY OF THE INVENTION

The lubricant supply system for a profile connection of a shaft and of a hub with the ability to shift axially and longitudinally, the system including a first outer element of the profile connection, shaft or hub, which surrounds another, second, inner element of the profile connection, hub or shaft, at least partially in the circumferential direction comprises either at least a distributor groove arranged in the area of the profile base on the circumference of the outer element of the profile connection and extending through the profile projections, or a distributor groove arranged in the area of the profile base on the outer circumference of the inner element of the profile connection and extending through the profile projections.

The distributor groove extends in the first instance over at least a part of the inner circumference of the outer element of the profile connection in the circumferential direction and is coupled to at least one lubricant supply conduit extending to the outer circumference of the outer element of the profile connection. In the second instance the distributor groove extends over at least a part of the outer circumference of the inner element of the profile connection in the circumferential direction and is coupled to at least one lubricant supply conduit extending to the axis of symmetry of the inner element.

According to the invention a distributor element is arranged extending in the shaft over its length in the circumferential direction. The distributor element divides the distributor groove into a first partial area located radially outside and into a second partial area located radially inside. The distributor element and the distributor groove are shaped and designed in such a manner that they form in their cooperation at least one, but preferably a plurality of valve positions between the first and the second partial area of the distributor groove. Either the shaft or the hub function as an outer element of the profile connection depending on the association with the drive end or with the output end.

This valve action achieves at first a distribution of the amount of lubricant on the outer circumference or the inner circumference of the distributor element via the distributor groove before the lubricant passes over to the second partial area and passes therewith into at least profile gaps occasioned by the working in of the distributor groove in the profile projections of the outer element or of the inner element of the profile connection and into the areas coupled to the latter, which areas are occasioned by the profiles of the individual elements of the profile connection which profiles mesh with each other. This can assure an almost uniform supply of lubricant which can be determined in time over the entire circumference or at least the partial area of the profile cross section which the distributor groove surrounds. In addition, the solution in accordance with the invention makes it possible to lubricate profile connections, especially profile connections with a large diameter or areas of profile cross sections with a large surface as uniformly and completely as possible with a precisely dosed amount of lubricant. That means that only the amount of lubricant is always used which is actually required and thus contamination, which increases with the amount of lubricant used, can be avoided for the system. In particular, such a device can be retrofitted without great problems into systems which already exist and are in use, since as a rule a central distributor groove is already present and no great expense for retrofitting and working is required for realizing the valve function given the appropriate designing and the use of suitable distributor elements, preferably annular elements.

The two basic variants cited in the following are conceivable for the association and design of the distributor groove in the circumferential direction.

1. At least one distributor groove covering only a partial area in the circumferential direction or a plurality of these grooves arranged in series in the circumferential direction is/are provided. The distributor grooves are free of a coupling among themselves.

2. The distributor groove extends over the entire circumference relative to the cross section of the outer element or, in the second instance of the inner element, preferably annularly in the circumferential direction, that is, over the entire inner circumference of the outer element of the profile connection or over the entire outer circumference of the inner element. The distributor element is designed in this instance as an annular element, preferably as a closed annular element.

The first possibility offers the advantage that even critical areas of a shaft-hub profile connection can be lubricated separately by themselves and/or in a reinforced manner without the lubrication having to take place over the entire circumferential area. The arrangement of the distributor grooves to each other in the circumferential direction preferably takes place in such a manner that the individual distributor grooves are separated from each other only by a profile projection on the outer element or, in the case of an arrangement on the inner element, by a profile projection on the inner element of the profile connection. Greater intervals between the individual distributor grooves are also conceivable.

In the case of the second, especially advantageous possibility the lubricant supply system for profile connections of shaft and hub with the ability to move axially and longitudinally comprises for the first-mentioned instance of the arrangement of the distributor groove on the outer element a distributor groove running in the area of the inner circumference of the outer element of the profile connection, e.g., of the hub, in the circumferential direction. The distributor groove can be coupled to a lubricant supply source via at least one lubricant supply conduit which extends in radial direction to the outer circumference of the outer element of the profile connection, in this instance of the hub. The invention provides that a distributor element in the form of an annular element running in the circumferential direction and preferably closed in itself is arranged in the distributor groove. This annular element divides the distributor groove into a first partial area and a second partial area. The first partial area is provided, relative to the axes of symmetry of shaft and hub in the assembled state, on a diameter which is greater than the diameter on which the second element is arranged. According to the invention the annular element exercises a valve action for the lubricant. That means that the lubricant can be introduced into the second partial area, dosed in time and amount, from which it runs into the profile connection. This design offers the additional advantage that in the case of existing profile connections the distributor grooves which are already present can be utilized and can be readily retrofitted by providing the distributor ring as regards the functions to be achieved with the solution of the invention.

In the case of the second, especially advantageous possibility the lubricant supply system for profile connections of shaft and hub with the ability to move axially and longitudinally comprises for the second-mentioned instance of the arrangement of the distributor groove on the inner element a distributor groove running in the area of the outer circumference of the inner element of the profile connection in the circumferential direction. The distributor groove can be coupled to a lubricant supply source via at least one lubricant supply conduit which extends in radial direction to the axis of symmetry of the inner element of the profile connection. A central supply line through the inner element, which runs in the area of the axis of symmetry of the inner element through the latter, can be used as lubricant supply source. The invention provides that a distributor element in the form of an annular element running in the circumferential direction and preferably closed in itself is arranged in the distributor groove. This annular element divides the distributor groove into a first partial area and a second partial area. The first partial area is arranged, relative to the axes of symmetry of shaft and hub in the assembled state, on a diameter which is smaller than the diameter on which the second partial area is arranged. The annular element exercises a valve action for the lubricant. That means that in this instance too, the lubricant can be introduced dosed in time and in amount from the first partial area into the second partial area, from which it runs into the profile connection.

Grease is used with preference as lubricant. However, the use of oils or other lubricants is also conceivable.

The realization for both basic variants can occur in different manners. In particular, essentially two basic design variants are distinguished.

1. Sealing function of the distributor element or annular element, which can be canceled at least in the case of lubricant: supply in the area of the intermediate space following the distributor groove in the area of the profile of the outer element of the profile connection.

2. The provision of slots in the area of the bearing surfaces of the distributor element or annular element in the distributor groove by providing either appropriate recesses in the area of the distributor groove and/or, however, appropriate recesses on the annular element.

The throttle effect can be adjusted via the ratio of the sum of the cross sections of the transfer slots to the sum of the cross sections of the distributor conduits, that is, among other things as a function of the number of distributor conduits and/or of their size. There is also the theoretical possibility of working throttle positions into the distributor conduits or the distributor grooves and/or in the area of the transfer slots. The working in can also take place additionally to the other measures.

In order to realize this design variant the distributor element or the annular element is to be selected, designed and arranged appropriately with regard to the material.

In the first-cited instance with the arrangement of the distributor groove on the outer element the distributor element or the annular element is designed in such a manner that it essentially seals the second partial area from the first partial area in the state of no supplying of lubricant and in the state of the supplying of lubricant it partially bends, under the building up of an overpressure in the distributor conduit, at least in the area of the intermediate spaces which result on the projecting profile parts from the working in of the distributor groove into the profile of the outer element of the profile connection, e.g., of the hub and which are preferably designed to be larger in cross section than the cross section of the distributor groove and as a result of the bending it delivers lubricant into this intermediate space in order to remove the pressure, from which it passes into the intermediate spaces of the intermeshing profiles.

The distributor element or the annular element then produces so-called transfer slots in these areas which slots are distinguished by an significantly smaller opening cross section than that of the lubricant supply conduit. According to the invention a high pressure builds up thereby in the first partial area of the distributor groove during the supplying of lubricant which pressure becomes active on the outer surface of the distributor element or of the annular element. As long as the force conditioned by the pressure on the outer surface is less than the force directed in the opposing direction by the nature of the distributor element or of the annular element or is in an equilibrium with the latter force, the lubricant is forced to distribute itself in the first partial area along the outer circumference of the distributor element or of the annular element in the distributor groove. A bending of the distributor element or of the annular element is not possible in the area of the intermediate spaces in the projecting profiles until the force exceeds the counterforce which can be generated by the distributor element or the annular element. This bending produces a transfer slot between the first and the second partial area which makes possible a flow of lubricant from the first into the second partial area and therewith a release of pressure in the first partial area. The slot being produced also exercises a dosing action at the same time thereby. However, these statements only apply in a modified fashion for the instance of the first lubrication. During the first lubrication, that is, before any lubricant at all is introduced into the distributor groove, the distributor groove contains air with a low viscosity. The air in the distributor groove must consequently first exit out of the groove. In order to realize this it is sufficient to provide appropriate differences in roughness, e.g., in the area of the contact areas of sealing element and wall of the distributor groove which differences make a transfer of air possible but still fulfil a sealing action against lubricant. The pressure in the first partial area of the distributor groove does not build up until after the escape of the air. The principle described here also applies in analogous fashion to the arrangement of the distributor groove on the inner element.

Another possibility then consists in designing the annular element independently of the arrangement of the distributor groove as a multipartite assembly, during which the sealing action and the production of the slots by the cooperation of the individual part elements are realized. A first possibility then consists in designing the distributor element from a plurality of partial rings which are coupled to each other yet can move against each other in axial direction. Another possibility then consists in designing the distributor element as a combination of a support ring and of a sealing ring. The support ring is arranged inwardly in radial direction and supports the sealing ring, which is arranged radially outward. The sealing ring is then either deformed in radial direction under the action of pressure in the first partial area of the distributor groove and thus frees the corresponding slots by corresponding co-deformation of the support ring, or the sealing ring is provided with passages in the direction of the support ring. In the last-cited instance the desired passage slots can already be realized by providing corresponding, appropriate surface rough areas on the outer side of the support ring facing the sealing ring and/or on the inside of the sealing element facing the support ring and by the action of pressure.

The second possible basic variant consists in providing a distributor element or an annular element in the distributor groove. In order to produce the communication between the first and the second partial area of the distributor groove pocket-like recesses are provided in the outer element of the profile connection, e.g., the hub, in the area of the intermediate space conditioned by the groove on the individual profile projections and/or corresponding, appropriate passages are provided on the distributor element or on the annular element itself. The latter make possible a throttling action during the transfer of the lubricant from the first partial area into the second partial area via the corresponding opening cross sections. In this instance no complete seal is produced between the first and the second partial area in the operating state of not filling with lubricant; however, the transfer cross sections with a small diameter bring about a corresponding throttling action so that the lubricant must be also distributed for the most part over at least a partial area of the circumference first, for a pressure buildup, before a transfer takes place.

The solution in accordance with the invention makes it possible to lubricate large-diameter profile connections completely with a precisely dosed amount of lubricant with a distributor groove. That is, only the amount of lubricant is necessary which is actually needed. An additional contamination of the system, which increases with the amount of lubricant used, can be avoided. In particular, such a device can be retrofitted without great problems into already existing systems since a central distributor groove is as a rule already present and, given the appropriate design and use of suitable annular elements, no great expense for reworking is necessary.

A great number of designs can be considered for the distributor element. For example, an annular element in the form of a piston support ring or of a partial area of a piston support ring is conceivable. Further possibilities consist in the use of a strip of sheeting or of a semifinished material, of an elastomer, a glass-fiber carbon fiber tube, corrugated steel bands, etc. The distributor element or the annular element can be designed from one layer or a plurality of layers which form a construction unit with each other but can be moved or deformed against each other in axial direction. The individual layers, on the other hand, can be formed from a plurality of plies connected to each other in an inseparable manner. This possibility is utilized in particular for the designing of piston support rings in order to achieve the optimum qualities regarding elasticity and rigidity as well as resistance to wear. The plies forming the surfaces in the circumferential direction are preferably made of especially wear-resistant material. A further possibility resides in the designing of the distributor element as an assembly comprising at least one support element and one sealing element, as already explained above. In this instance too, the design and selection of the combination most suitable for use is a matter of the judgement of the responsible expert in the art.

When a distributor element or an annular element comprising several layers is used, in particular, multilayer bands, e.g., in the form of steel bands or semifinished material are used. Other embodiments are also conceivable.

The ends of the individual layers or of a distributor element in the form of an annular element can be designed either in the form of an oblique step, which is realized in particular when using annular elements in the form of a snap ring or circlip, or in the case of elements subjected regarding their form of a high degree of rigidity. In the case of other layer embodiments it is furthermore conceivable to connect the ends to each other in an overlapping manner, e.g., by adhesion, in which case the overlapping width is preferably filled out in correspondence with the width of the distributor groove. A further possibility is to couple the ends so that they butt against each other.

The use of piston support rings in order to realize this function has the advantage that commercially available, standardized, annular elements can be used. So-called guide rings can also be used which consist of composite fabric materials and are used in highly stressed sliding connections. The latter exhibit as a rule a great resistance to pressure and extraordinary wearing qualities which assure a long service life.

In sum, it can be established that the individual functions are determined by the form of the distributor element and/or its partial components and/or the design of the distributor element and/or its partial components and/or the selection of material and/or the surface quality and/or the providing of passages.

A further significant advantage of the solution in accordance with the invention is the fact that the system can be kept essentially free of contamination by means of the precise dosing via at least one, but preferably several valve positions produced over the annular element in the distributor groove.

Essentially two basic possibilities can be conceived for the design of the distributor groove:

1. The design of a distributor groove with essentially the same cross section, viewed in radial direction.

2. The design of a distributor groove in radial direction with at least two partial grooves of different dimensions in cross section.

In the case of the first-cited possibility it is necessary that the distributor element or the annular element is provided for realizing the function of sealing action essentially with an appropriate width tolerance so that this element rests with its side surfaces essentially on the inner surfaces of the distributor groove and only by the bending due to the high pressure in the first partial area can a corresponding slot be produced.

In the case of a division into two partial grooves and the arrangement of the distributor groove on the outer element the groove which is the outer one in the radial direction is provided with a smaller cross section than the groove which is the inside one in the radial direction. In the case in which the distributor groove is arranged in the inner element the groove which is the outer one in the radial direction has a larger cross section than the partial groove which is the inner one in the radial direction. The cross-sectional transition is used as a contact or sealing surface, in which case a slot is also provided between the side areas and the inner surfaces of the distributor groove. This slot is significantly smaller in its cross section than the cross section of the lubricant supply conduit associated with the distributor groove. The seal is realized here essentially by the contacting of the annular element in the area of the distributor groove which is the inner one in the radial direction. In the case of loading with pressure and a corresponding bending of the annular element a transfer slot is produced by the lifting of the pressure ring in this area and can, as a result of the bending in the area of the teeth gaps, free a flowthrough cross section to the latter.

For the case in which the slot seal is not sufficient, which can occur especially in the case of large profiles, the annular element can de designed in such a manner that the width tolerances no longer has to be determined so precisely but rather can be made more generously in that the annular element is designed in the form of an O-ring seal. This concerns a possibility of sealing which can be realized with standard components and which can be defined. A support ring is associated with the annular element is this instance, preferably for guidance. The division into two partial areas in the distributor groove takes place in this instance via the O-ring seal. The O-ring is shifted partially in a radial direction in the direction of the shaft due to elastic deformation upon the loading with pressure when a correspondingly high pressure has been achieved. On the other hand, a bending is only possible in the area of the teeth gaps so that an exiting of lubricant from the first partial area of the distributor conduit into the teeth can take place only in these areas. The cross section of the support ring can be designed in different manners thereby. A rectangular form is conceivable, as is a rectangular form provided with a round area for a better guidance of the O-ring. The precise selection is left to the judgement of the expert in the art. The support ring itself is not only to be manufactured with the precise width tolerance required, but the area at the ends of the support ring can be designed in a simpler manner since this area no longer has any meaning for the sealing function. Another possibility in the case of the previously described variants of minimizing as much as possible the influence of a connection of the support-ring ends on the method of operation consists in that in at least bipartite designs of the distributor groove the connection is designed in such a manner that it extends in the radially outer area or inner area, depending on the association of the distributor groove to the outer or the inner element, of the distributor groove. The distributor groove is preferably arranged in the circumferential direction of the profile connection. The distributor groove is preferably worked completely into the profile base. The annular element is preferably arranged in such a manner thereby that it seals with the profile base essentially in the assembled state. However, another possibility consists in designing the distributor groove, when projecting the vertical line to the line of symmetry of the hub into a common plane, at an incline to the latter. This means that the distributor groove does not have a cross section whose individual surface components have the same axial interval relative to a reference surface. In this instance the groove describes, when viewed from the right, a circular arc. In the other instance, given an inclined design, the groove describes an oval form upon the projection of this view into one plane.

The solution of the invention can be used for a great number of profile connections, e.g., for multi-groove profiles in the form of splined-shaft profile connections, for cogged or toothed profile connections and for polygonal profile connections. The use in drive, i.e., cardan shafts with axial, longitudinal compensation is cited here by was of example as a possible main area of application.

A great number of possibilities are also conceivable for the design of the distributor groove, ranging from a design with constant cross section in radial direction to a design with a plurality of cross-sectional modifications in radial direction with the cross-sectional dimensions increasing inwardly in radial direction, that is, in the direction of the axis of symmetry of the hub. The transitions are preferably designed to be rounded in order to prevent the notch effect. It is pointed out once more by way of summation that the slot being produced or provided for the reaction of the valve effect has a considerably lesser cross-sectional dimension that the cross section of the infeed, especially of the lubricant supply conduit. Only the appropriate ratio between infeed and slot makes possible the pressure buildup by a corresponding distribution of the lubricant on the outer circumference or inner circumference of the annular element as a function of the distributor groove.

The annular element itself can have any desired cross section. However, embodiments with annular elements with rectangular or round cross section are preferably used. However, other cross-sectional forms are also not excluded.

The selection of the precise embodiment of the distributor groove and of the arrangement of the annular element as well as of its design as regards its shape, the cross section as well as of the material depends on the requirements of use, which are also, in particular, a function of the magnitude of the forces to be transferred and therewith of the size of the profile connection and are in the area of competency of the responsible expert in the art.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 7 shows another embodiment of a lubricant supply system of a profile connection, which system is designed in accordance with the invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1A:
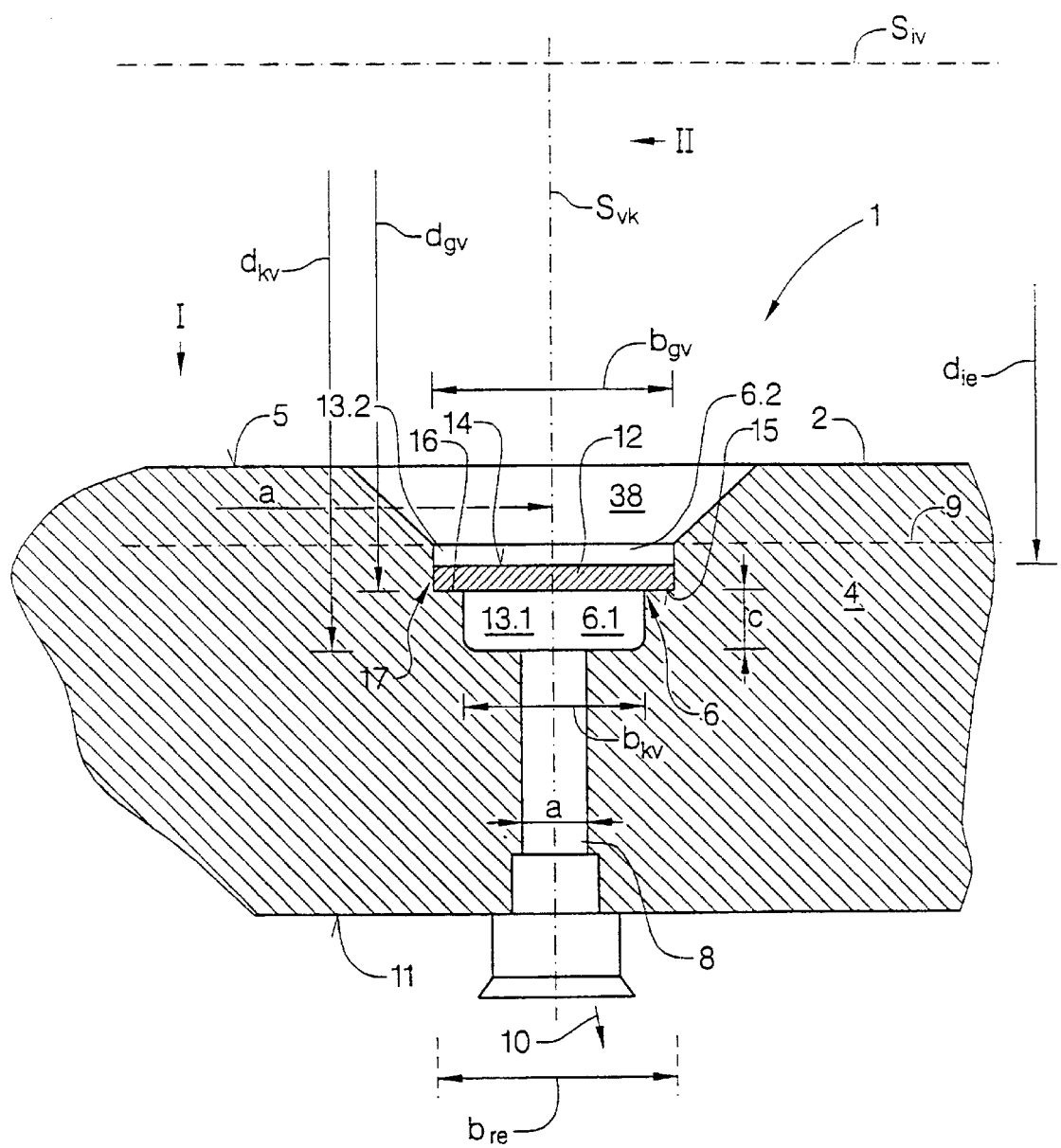
FIGS. 1a and 1b illustrate an embodiment of a lubricant supply designed in accordance with the invention and shown in an axial section and a view from the right.

FIG. 1a illustrates in an axial section an advantageous embodiment of a lubricant system 1 designed in accordance with the invention and for a profile connection 2 of a shaft 3 and of a hub 4. Shaft 3 forms an inner element of the profile connection here and hub 4 forms an outer element of profile connection 2. Profile connection 2 is designed, in the instance shown, as a splined-shaft connection.

Lubricant system 1 comprises distributor groove 6 running in the area of inner circumference 5 of hub 4 in the circumferential direction of hub 4. Distributor groove 6 is coupled to space 38 which is formed by the working in of the groove into the profiles of the hub and which remains uncovered even during the intermeshing of the profiles of shaft 3 and of hub 4, and, is coupled above it to intermediate spaces 7 arising from the play of the individual profiles of the profile connection between shaft 3 and hub 4. Distributor groove 6 is worked into profile base 9 of hub 4. The latter can be connected via at least one lubricant supply conduit 8 to lubricant supply source 10 which can be coupled to this supply conduit 8 and which is not shown in detail here.

Lubricant supply conduit 8 extends in radial direction from distributor groove 6 to outer circumference 11 of hub 4. Lubricant supply conduit 8 is preferably designed directly in radial direction, that is, vertically to axis of symmetry $S_N$ of hub 4. In this instance axis of symmetry $S_{VK}$ of lubricant supply conduit 8 runs upon the projecting with axis of symmetry $S_N$ into a common plane, vertically to the latter. However, an inclined design to a connection line between outer circumference 11 of the hub to its line of symmetry $S_N$ is also conceivable. Distributor groove 6 is preferably arranged in analogy directly in the circumferential direction of hub 4, that is, associated with a cross section which can be formed in the assembled state by a profile section through hub 4 on a constant axial dimension from the side surfaces of hub 4 which preferably run parallel to each other. This means that the middle line $M_{VNopt}$ of distributor groove 6 runs upon projection with axis of symmetry $S_N$ of hub 4 into a common plane vertically to the latter.

Figure 2A:
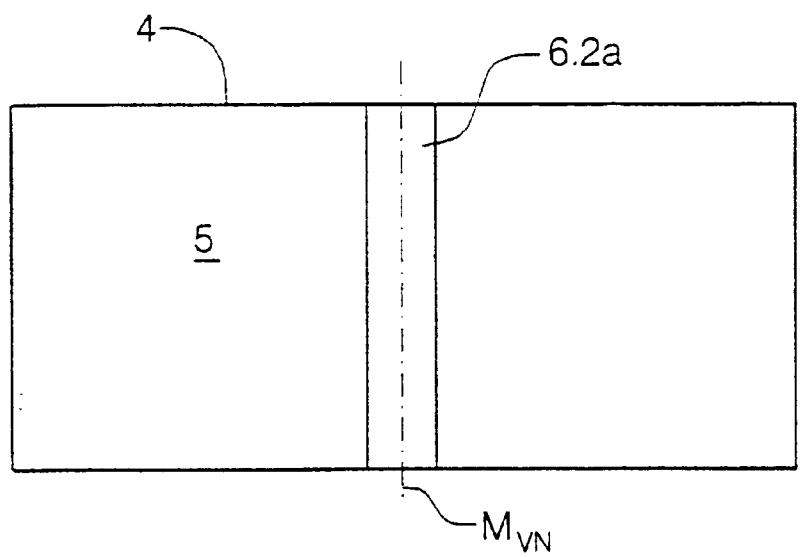
FIGS. 2a and 2b illustrate two possible embodiments of the courses of distributor grooves in the circumferential direction on the inner circumference of the hub.

FIG. 2a illustrates a view I corresponding to FIG. 1a on inner surface 5 of hub 4 in the folded-out state. The distributor groove is designated with 6.2a.

However, it is also conceivable to arrange distributor groove 6 in the circumferential direction inclined relative to optimal middle line $M_{VNopt}$ for the distributor groove. Such an embodiment is shown in a view onto inner surface 5 of hub 4 according to FIG. 2b. The middle line of the distributor groove, designated here with 6.2b, is designated with $M_{VNG}$.

Distributor groove 6 worked into profile base 9 can be divided in the instance shown into two partial distributor grooves, a first partial distributor groove 6.1 which is also designated as the small distributor groove and which is arranged in radial direction on a larger diameter $d_{KV}$ than the second distributor groove 6.2, which is also designated as the large distributor groove and is arranged on a smaller diameter $d_{gV}$. The first distributor groove 6.1 has a smaller axial extension, that is, a smaller width $b_{KV}$, than the second distributor groove 6.2 with the width $b_{gV}$. Annular element 12 is arranged in distributor groove 6. This element serves to divide distributor groove 6 into two partial areas 13, a first partial area 13.1 and a second partial area 13.2. The first partial area 13.1 is arranged on a greater diameter, that is, viewed in radial direction, further outside than the second partial area 13.2. The first partial area 13.1 is therefore also designated as the outer partial area whereas the second partial area 13.2 can also be designated as inner partial area. The size of the first partial area 13.1 and its radial extension circumference is determined in the concrete instance by the depth of small distributor groove 6.1 in radial direction. The second partial area 13.2, that is, the inner partial area, is determined by the dimensions of the large distributor groove 6.2, that is, of the second partial groove area with subtraction of cross-sectional area A of annular element 12.

Annular element 12, which forms in the normal state a closed inner surface 14 running essentially on a certain diameter $d_{rE}$ and running in the circumferential direction and surrounding, so to say, shaft 4 on a larger diameter, is preferably designed in such a manner that element 12 seals first partial area 13.1 against the second partial area in a state in which no lubricant supply, that is, no new supply of lubricant is to take place. This is achieved by an appropriate fit between width dimension $b_{gV}$, the large distributor groove relative to the width dimension $b_{rE}$ of annular element 12. Another possibility, which can also be realized by itself, consists in that only annular element 12 rests in a partial area of its outer surface 15 on the transitional surface from small distributor groove 13.1 to large distributor groove 13.2. The last-named embodiment takes place in particular if annular element 12 has the appropriate rigidity which makes possible in any case a resting or contacting of at least one partial area of outer surface 15 of annular element 12 in the assembled position. This is the case, as a rule, if annular element 12 is introduced with oversize into distributor groove 6, especially the large distributor groove 6.2.

During the supplying of lubricant by means of a lubricant supply source 10 which can be connected to supply conduit 8 the lubricant passes into the first partial area 13.1, in this instance small distributor groove 6.1. The lubricant is distributed thereby in the circumferential direction of the annular element, during which a pressure is built up in small distributor conduit 6.1 As long as there is no equilibrium between this produced pressure and the counterforce produced by the rigidity of annular element 12, that is, the pressure or the force exerted by the pressure on outer surface 15 is less or equal to the oppositely directed force from annular element 12, no lubricant passes into large distributor groove 13.2 When the pressure becomes greater in small distributor conduit 6.1 annular element 12 is readily deformed, e.g., in an elastic manner, and the sealing effect between annular element 12 and stop surface 16, that is, the first partial area 13.1 and the second partial area 13.2 is canceled. A small slot 17 or 18 then forms. This slot brings it about that the lubricant can exit from the first partial area 13.1 to the second partial area 13.2 in a strongly dosed form. As a result of the fact that the lubricant can not pass immediately from small distributor groove 13.1 to large distributor groove 13.2 without flow resistance, it is forced to distribute itself in circumferential direction on outer surface 15 of annular element 12 at first until the appropriate elevated pressure is achieved.

Developing slot 17, regardless in which form, has a significantly smaller cross section than lubricant supply cross section Q in supply conduit 8. Annular element 12 is thus utilized to produce a resistance for the lubricant in order to first force it to be distributed in circumferential direction in small distributor groove 6.1 and to permit an exit or transfer into large distributor groove 6.2 only after corresponding distribution in circumferential direction.

However, annular element 12 is preferably always designed with a corresponding width tolerance in regard to the width $b_{gV}$ of large distributor groove 6.2.

Figure 1B:
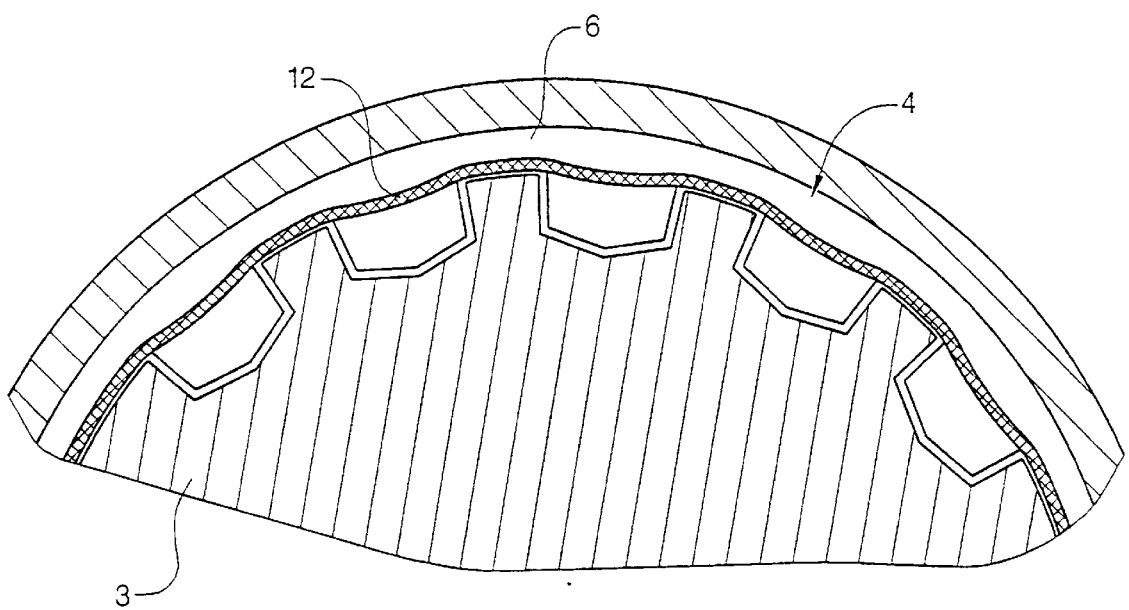

FIG. 1b illustrates a section corresponding to view II of FIG. 1a of the cross section of hub 4 in a state in which lubricant is being supplied. It is apparent therefrom how the form of the annular element is altered in circumferential direction under the influence of pressure in the distributor groove and therewith the lubricant from the first partial area 13.1 into the second partial area 13.2 and therewith into intermediate spaces 7 which are determined by the play between the individual profiles, especially the outer profile surfaces. Due to the fact that the lubricant is forced by the design of the invention before the transfer into intermediate space 7 to run over a part of outer circumference 15 of annular element 12, a single lubricant supply conduit 8 can be sufficient already in the case of profile connections with a small diameter. In the case of profile connection with a rather large diameter, like those used in particular in drive shafts with axial, longitudinal compensation, preferably several lubricant supply conduits 8 distributed over the circumference are arranged. The latter can be arranged in different intervals from each other or distributed at equal intervals over the circumference.

Moreover, the cross-sectional transitions on the distributor grooves, especially small distributor groove 6.1 as well as large distributor groove 6.2 are preferably designed to be rounded in order to reduce the notch effect.

Figure 2B:
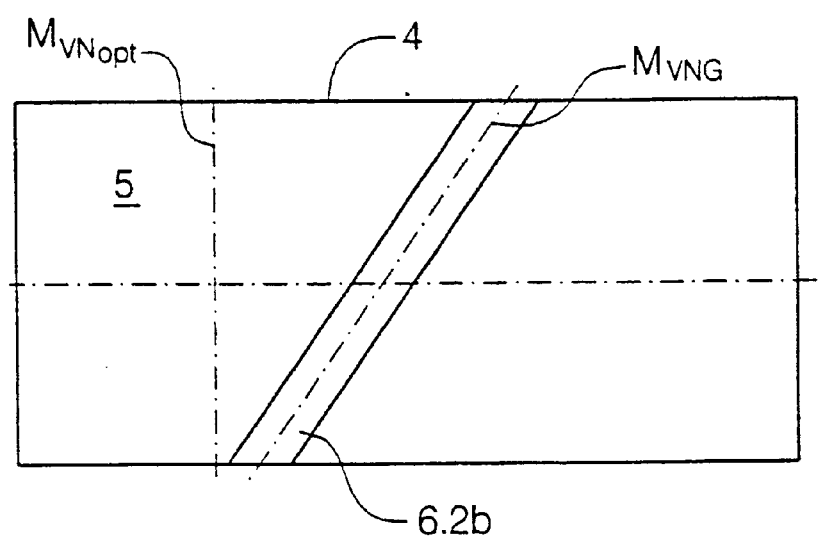

FIGS. 2a, 2b illustrate the possibilities of the arrangement of distributor groove 6, shown here with 6.1 for the embodiment according to FIG. 1a and with 6.2 for an alternative embodiment in FIG. 2b. The variant which is the simplest and the most economical as regards manufacture consists in associating the distributor groove in the circumferential direction with a certain cross section. This corresponds to the view onto inner circumference 5 according to FIG. 2a. FIG. 2b illustrates an alternative embodiment; however care is to be taken here that the lubricant path between annular element 12 and outer partial area 13.1 of distributor groove 6 is enlarged compared to the design in FIG. 2a.

Figure 3:
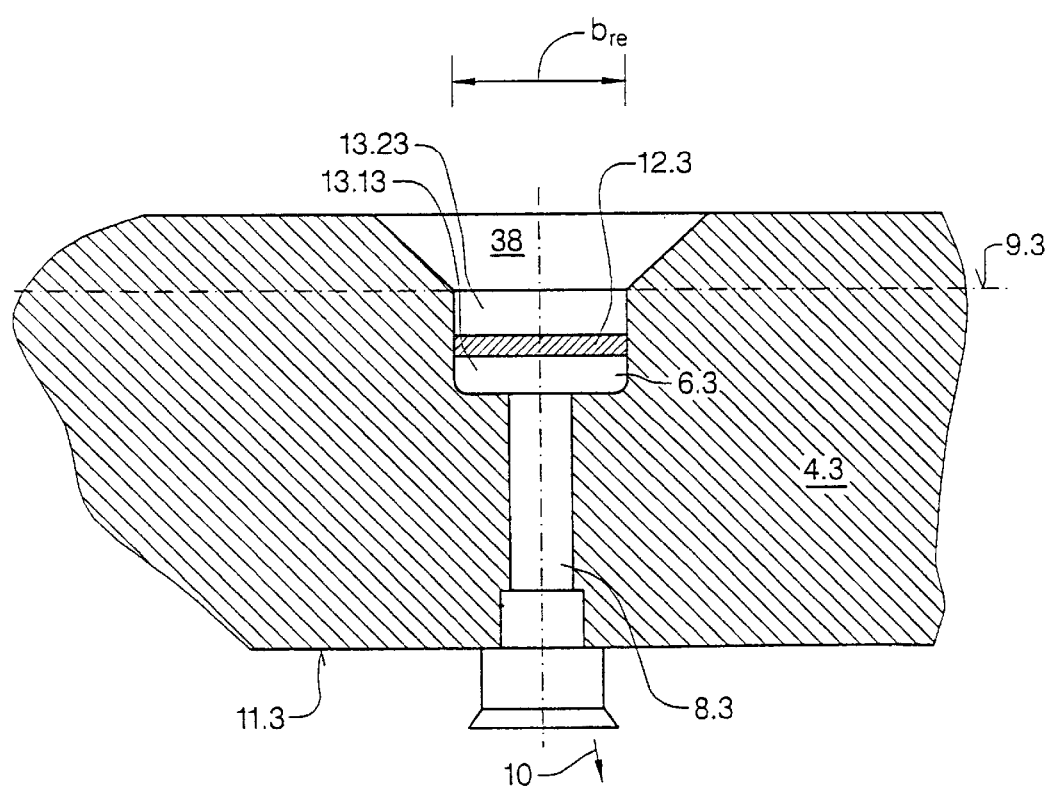
FIG. 3 illustrates by way of example another embodiment of a design of a lubricant system in accordance with the invention with a distributor groove with constant cross section.

FIG. 3 illustrates a further alternative embodiment of the solution of the invention which is distinguished by simplicity and an economical manufacture. The basic structure corresponds to the solution according to FIG. 1a, for which reason the same reference numerals are used for the same parts.

FIG. 3 illustrates a view in axial section onto profile connection 2.3 comprising shaft 3.3 and hub 4.3. Distributor groove 6.3 is worked into profile base 9.3 which groove encompasses a constant cross section over its depth c3. Distributor groove 6.3 is associated with at least one lubricant supply conduit 8.3 which extends in the direction of outer circumference 11.3 of hub 4.3 and can be coupled as needed to lubricant supply source 10. An annular element 12.3 is inserted with appropriate fit into annular distributor groove 6.3 and serves to form first partial area 13.13 which is designated as outer partial area and a second partial area 13.23 designated as inner partial area. There are a great number of possibilities for the designing and shaping of annular element 12.3. In a first instance annular element 12.3 can be designed to be rigid in axial direction, that is, over width $b_{rE}$, but elastic in radial direction. This has the result that under loading with pressure the ring experiences a bending over its width $b_{rE}$ and as a result forms a slot for the lubricant in the area of its side edges and in cooperation with the inner walls of distributor groove 6.3, which lubricant flows out of the first partial area 13.13 over into the second partial area 13.23. The size of the slot determines the amount of flowthrough.

Another possibility, which is not shown here, consists in providing an annular element in the form of a band in an embodiment corresponding to FIG. 1a which element can also be designed, e.g., in the form of an elastic band and achieves a sealing action by means of an appropriate fastening on the inner walls of the groove, on which fastening can also take place only partially; however, the areas of the teeth gaps, that is, intermediate spaces 38 are held free from such a connection on account of the groove in the profile projections of hub 4.3.

Figure 4A:
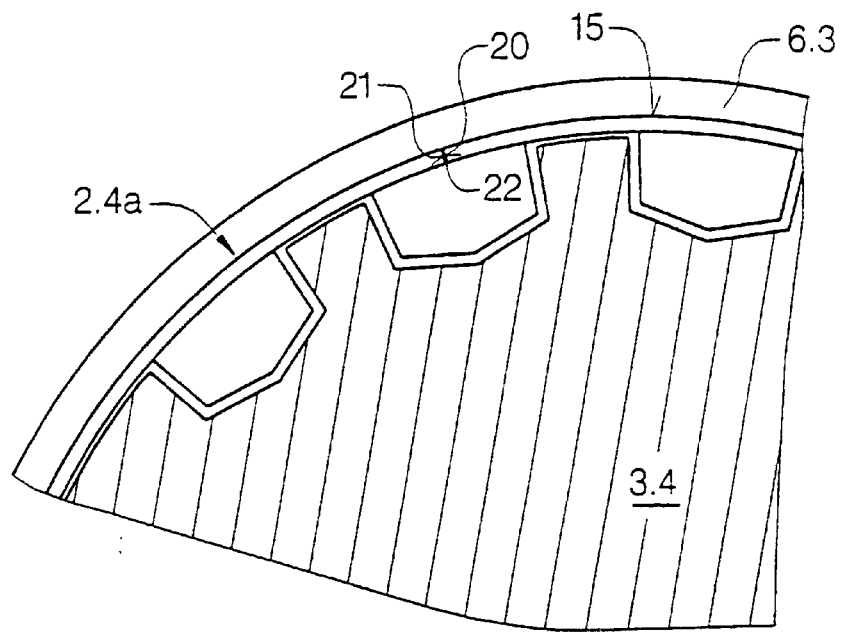
FIGS. 4a and 4b illustrate two embodiments for the shaping of the connection of the ends of the annular element.
Figure 4B:
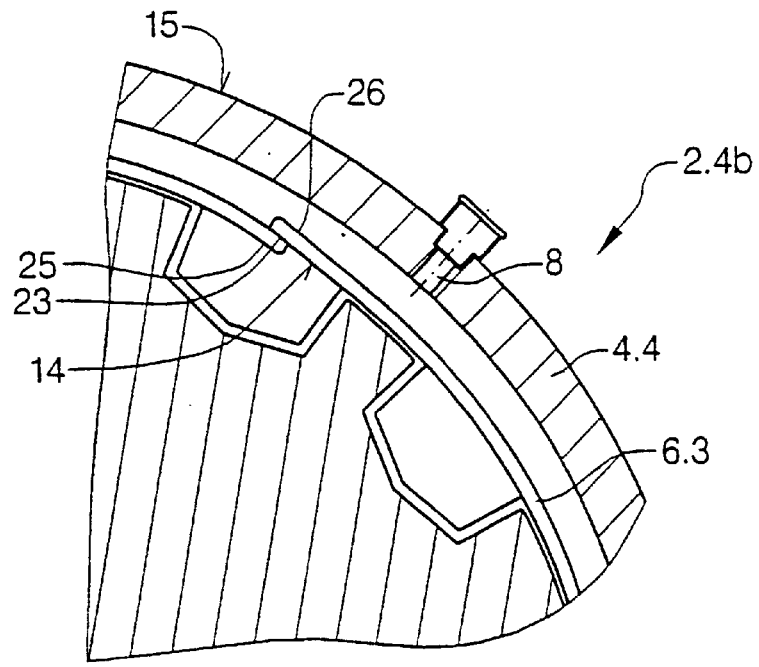

FIGS. 4a, 4b illustrate two possibilities for shaping the connection of the ends of annular element 12 in a view onto the cross section of profile connection 2.4a and 2.4b. FIG. 4a illustrates a connection in the form of a junction or joint 20. The two ends butt on one another with surfaces 21, 22 facing one another and are inseparably connected to one another by an adhesive or sealing compound. FIG. 4b shows another possibility in the form of overlap 23 in which the two end areas 25, 26 of annular element 12 come into abutment in the area of their outer surface 15 or inner surface 14. Overlap 23 is preferably provided in the area of intermediate space 38 present on account of the working in of groove 6.3 into the profile projections of hub 4.4 in the form of a tooth gap.

Figure 5:
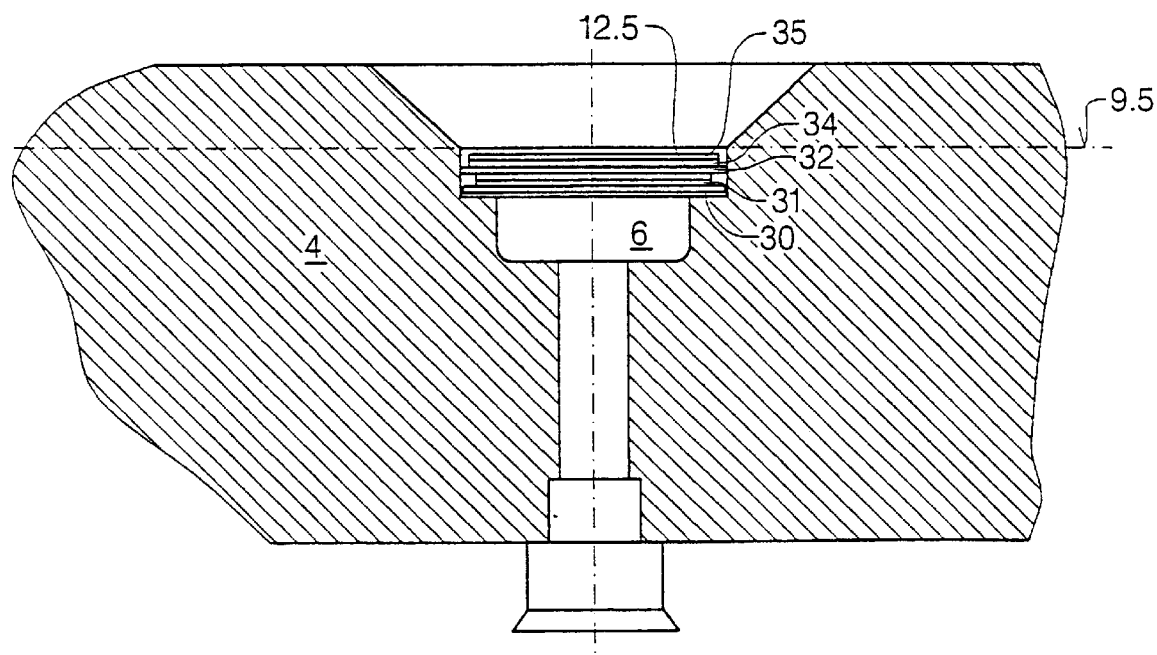
FIG. 5 illustrates an embodiment of an annular element in the form of a multi-layer band.

FIG. 5 illustrates another embodiment of an annular element in the form of a multilayer band 12.5. The individual layers are arranged superposed above each other in radial direction and designated with 30 to 35. There is a sliding connection between the latter. The sliding connection makes possible a relative movement of individual layers 30 to 35 in axial direction against each other. A sealing effect can be achieved by the different positions in axial direction by means of this element 12.5 and, upon loading with pressure, a release of a corresponding slot can be achieved.

Figure 6A:
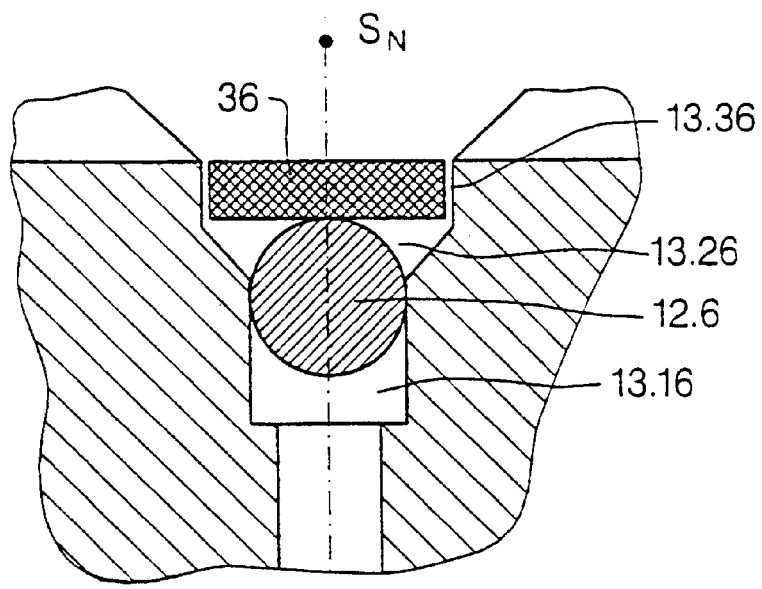
FIGS. 6a to 6c illustrate the embodiment of an annular element in the form of an O-ring seal with associated support ring in a distributor groove with a different cross section as well as its method of operation.
Figure 6B:
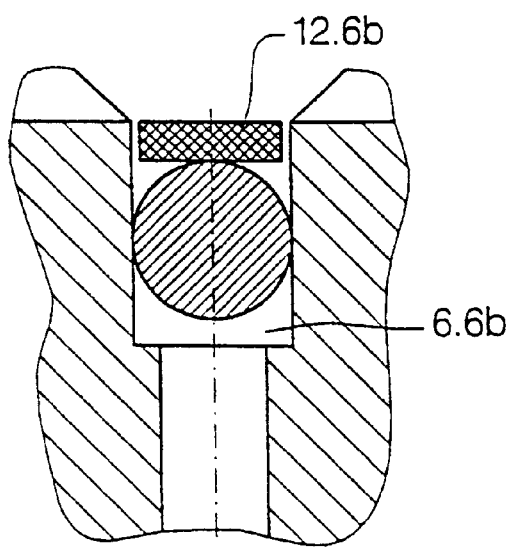
Figure 6C:
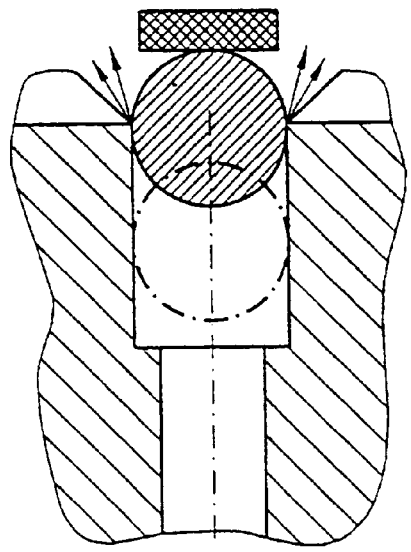

FIGS. 6a to 6c illustrate a further embodiment of the distributor element in the form of an annular element 12.6 comprising sealing element 40a and 40b in the form of an O-ring and comprising a support element 36a and 36b. Sealing elements 40a and 40b in the form of an O-ring assume the division of distributor groove 6 into a first partial area 13.16 and a second partial area 13.26. A third partial area 13.36 is provided in the instance shown. Since O-ring 40a and 40b are designed to be relatively elastic, support ring 36 is associated with it for guidance, which support ring is connected into the O-ring subsequently in radial direction in the direction of the axis of symmetry of hub $S_N$. Support ring 36 has the task in particular of assuming guide tasks.

FIG. 6b illustrates an arrangement of an annular element 12.6b comprising sealing element 40b and support element 36b in accordance with FIG. 6a in distributor groove 6.6b with a cross section which is constant in radial direction. FIG. 6c illustrates the associated method of operation. It is apparent therefrom that due to the pressure developing during the supplying of lubricant, O-ring 40b experiences a deformation in the area of the profile gap on account of its elasticity which deformation makes possible a transfer of the lubricant in dosed form.

FIG. 7 illustrates by way of example and in a schematically simplified fashion an embodiment with several distributor grooves 6.71, 6.7b. These grooves extend over a partial area of the circumference in circumferential direction, associated with a certain cross section of hub 4.7 and arranged in series. The two distributor grooves 6.7a and 6.7b are separated from one another by profile projection 41a of hub 4.7. Distributor elements 12.7a and 12.7b are arranged in distributor grooves 6.71 and 6.7b. The method of operation and the construction of distributor elements 12.7a and 1/7b can correspond to the embodiments described in FIGS. 1–6 and 8. The determination of the number and the length of the distributor grooves, their shape and the selection of the distributor elements as well as their shape is left to the expert in the art.

Figure 8A:
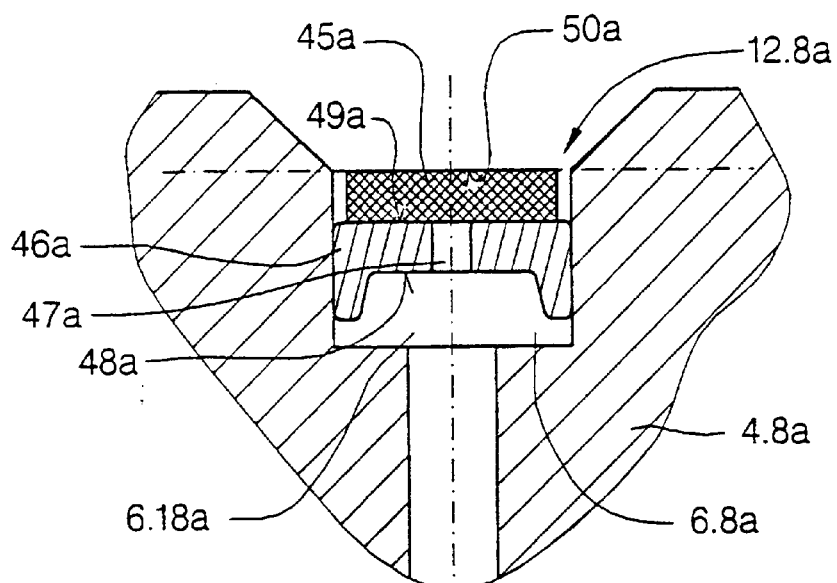
FIGS. 8a and 8b illustrate other embodiments of the distributor element.
Figure 8B:
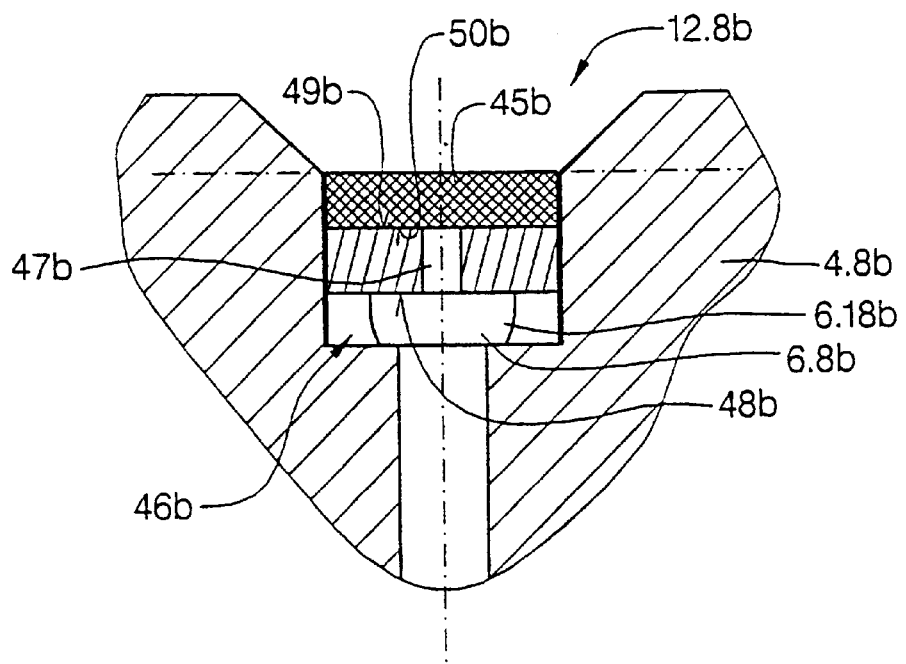

FIGS. 8a and 8b illustrate in a section from an axial section another embodiment of a distributor element 12.8 in the form of a structural component comprising a support element 45a and 45b and a sealing element 46a and 46b in a distributor groove 6.8a and 6.8b. The distributor groove has a constant cross section in the instance shown. However, a design with several cross sections with different dimensions or in accordance with FIG. 1a or 6a is also conceivable. In FIG. 8a the sealing action is achieved due to the slightly conical shaping of sealing element 46a, here due to the U-shaped cross section of sealing element 46a. However, a design corresponding to FIG. 8b is also conceivable in which design the sealing element is fitted with an appropriate fit, e.g. a transition fit or press fit, but preferably with a tight fit into distributor groove 6.8b. Sealing elements 46a and 46b have at least one through opening 47a and 47b extending from outer circumference 48a and 48b of sealing element 46a, 46b to inner circumference 49a, 49b of the sealing element. Support element 45a, 45b and sealing element 46a, 46b make contact at least over a part of their outer surface 50a, 50b and/or their inner surface 49a, 49b, viewed in the assembled state. Outer surface 50a, 50b of support ring 45a, 45b is provided with a certain roughness which is, e.g., greater than the roughness of inner surface 49a, 49b of sealing element 46a, 46b. There is also the possibility of making the roughness of inner surface 49a, 49b of the sealing element greater than that of outer surface 50a, 50b of support element 45a, 45b or equal to it. During filling with lubricant, the rough surface first allows the air to flow out with little resistance. If distributor groove 6.18a, 6.18b is full of grease the contact point between the sealing element and the support element with its rough surface acts like a small leakage position. The increased resistance due to the high viscosity of grease allows the pressure in the distributor groove to rise. The leak can be enlarged or reduced with the size and/or the number of through openings.

Figure 9:
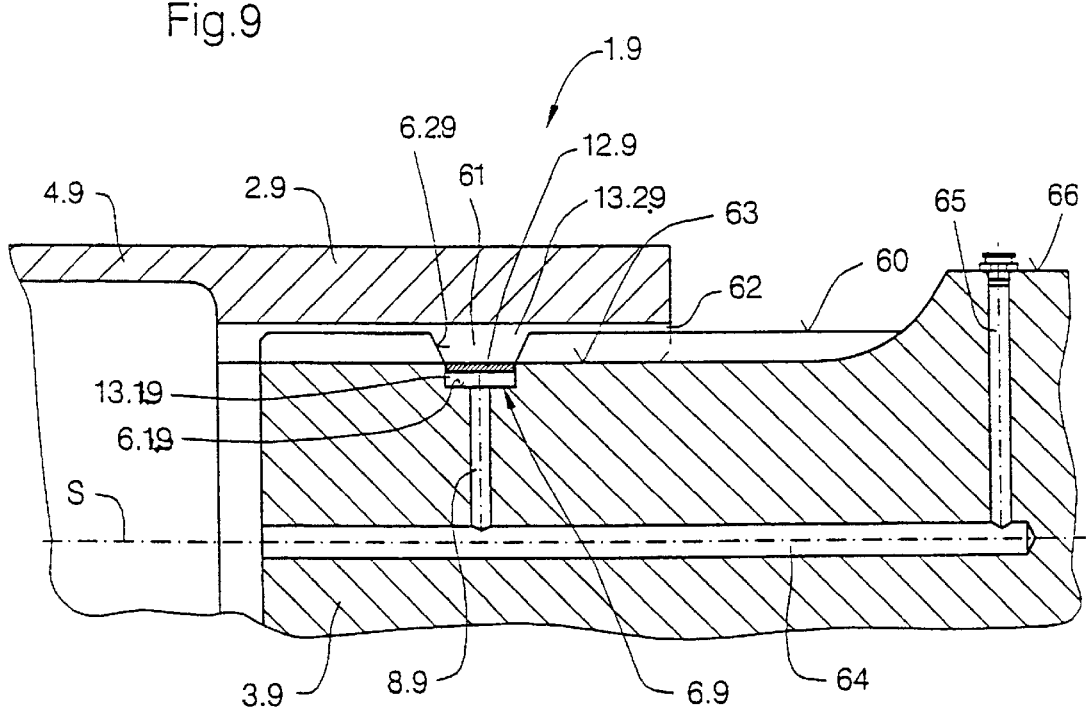
FIG. 9 illustrates an embodiment of a lubricant supply system, designed in accordance with the invention, of a profile connection in which the distributor groove is arranged in the inner element of the profile connection.

FIG. 9 illustrates in axial section another advantageous embodiment of a lubricant system 1.9 designed in accordance with the invention for a profile connection 2.9 of a shaft 3.9 and a hub 4.9. Shaft 3.9 also forms an inner element of the profile connection and hub 4.9 an outer element of profile connection 2. Profile connection 2.9 is designed as a splined-shaft connection. Lubricant system 1.9 comprises distributor groove 6.9 running in the area of outer circumference 60 of shaft 3.9 in the circumferential direction of the shaft. Distributor groove 6.9 is coupled to area 61 which is formed due to the working in of the distributor groove into the profiles of shaft 3.9 and which area remains uncovered even during the intermeshing of the profiles of shaft 3.9 and hub 4.9 and is coupled over it to intermediate spaces 62 arising as a result of the play of the individual profiles of profile connection 2.9 between shaft 3.9 and hub 4.9. Distributor groove 6.9 is worked into profile base 63 of shaft 3.9. The latter can be coupled via at least one lubricant supply conduit 6.9 to lubricant supply source (not shown in detail here) which can be coupled to it. The coupling between lubricant supply conduit 9.9 and lubricant supply source takes place via central lubricant supply line 64 extending through the inner element, that is, shaft 3.9. Lubricant supply line 64 is arranged with preference in the area of axis of symmetry S of inner element 3.9. However, embodiments are also conceivable which comprise an arrangement of a plurality of lubricant supply lines 64 at uniform intervals in the circumferential direction on a certain diameter of the inner element in order not to produce any imbalances caused by the lubricant supply system during the operation of the drive shaft. In the instance shown, central lubricant supply line 64 can be supplied with lubricant via lubricant line 65 which can be coupled to it and which extends from central lubricant supply line 64 in radial direction to outer circumference 66 of shaft 3.9.

Distributor groove 6.9 worked into profile base 63 can be divided in the instance shown into two distributor grooves, a first distributor groove 6.1.9, which is also designated as small distributor groove and is arranged in radial direction on a smaller diameter d than the second distributor groove 6.2.9, which is also designated as large distributor groove and is arranged on a larger diameter d than the first distributor groove. The first distributor groove 6.1.9 has a lesser axial extent, that is, lesser width than the second distributor groove 6.2.9. The distributor element, which is designed as an annular element, is designated with 12.9 and arranged in distributor groove 6.9. It serves to divide distributor groove 6 into two partial areas 13.9, a first partial area 13.1.9 and a second partial area 13.2.9. The first partial area 13.1.9 is arranged on a smaller diameter, viewed in radial direction, than the second partial area 13.2.9. The first partial area is designated as inner partial area whereas the second partial area 13.2.9 can also be designated as outer partial area. The extent of the first partial area 13.1.9 is determined in radial direction by the depth of the small distributor groove 6.1.9 minus the thickness of distributor element 12.9. The second partial area 13.2.9, that is, the outer partial area, is determined by the dimensions of the large distributor groove 6.2.9 in radial direction. The method of operation of distributor element 12.9 corresponds to that described in preceding FIGS. 1 to 8. Even the statements concerning the designing of distributor element 12.9, especially the design in circumferential direction as well as in radial direction and the distributor groove as well as the coupling with additional sealing elements apply by analogy to this embodiment according to FIG. 9.

In the embodiments according to FIGS. 1 to 9 the outer element of the profile connection is designed, by way of example, as a hub. It is also conceivable to assign the operation of the shaft to the outer element of the profile connection.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lubricant supply system for a profile connection of a shaft and of a hub with the ability to transfer torque between said shaft and hub and move axially and longitudinally, said supply system comprising:

a first outer element having an inner and an outer circumference, said element on a base of the profile connection which surrounds another, second inner element of the profile connection at least partially in a circumferential direction, said first outer element attached to said hub and said second inner element attached to said shaft;

at least one distributor groove extending in circumferential direction over at least a part of the inner circumference is arranged in the area of the profile base on the inner circumference of the outer element of the profile connection, said distributor groove located between said first outer element and said second inner element;

at least one lubrication supply conduit;

said distributor groove coupled to said at least one lubricant supply conduit which extend to the outer circumference of said outer element of the profile connection;

a distributor element extending over the length of the distributor groove in circumferential direction and arranged in said distributor groove said distributor element dividing the distributor groove into a first partial area located radially outside and into a second partial area located radially inside; and said distributor element and said distributor groove constructed in such a manner that they form in their cooperation a plurality of valve positions between said first and said second partial areas of said distributor groove.

2. A lubricant supply system for a profile connection of a shaft and of a hub with the ability to transfer torque between said shaft and hub and move axially and longitudinally, said supply system comprising:

a first outer element on a base of the profile connection surrounds another second, inner element of the profile connection, at least partially in a circumferential direction said inner element having an outer circumference, said first outer element attached to said hub and said second inner element attached to said shaft;

at least one distributor groove extending over at least a part of the outer circumference in circumferential direction is arranged in the area of the profile base on the outer circumference of said inner element of the profile connection;

at least one lubrication supply conduit;

said distributor groove coupled to said at least one lubricant supply conduit extending through the inside of said inner element of the profile connection;

a distributor element extending over the length of said distributor groove in circumferential direction and arranged in said distributor groove, said distributor element dividing said distributor groove into a first partial area located radially outside and into a second partial area located radially inside; and said distributor element and said distributor groove constructed in such a manner that they form in their cooperation a plurality of valve positions between said first and said second partial area of the distributor groove.

3. The lubricant supply system according to claim 1, in which a plurality of distributor grooves are provided which extend in circumferential direction over at least a part of the circumference and are arranged in series in circumferential direction, said distributor grooves are free of a coupling between one another.

4. The lubricant supply system according to claim 3, in which the individual said distributor grooves are arranged in series in circumferential direction are separated from one another only by a profile projection on said outer element of the profile connection when the distributor grooves are arranged on said outer element.

5. The lubricant supply system according to claim 1, in which said distributor groove extends in circumferential direction around the entire circumference; and said distributor element is designed as an annular distributor element.

6. The lubricant supply system according to claim 2, in which said distributor groove is symmetrically designed when arranged in said inner element of the profile connection, observed in a view onto the cross section of said inner element of the profile connection, with regard to a plurality of axes lying in the cross-sectional plane of said inner element of the profile connection and extending through the axis of rotational symmetry of said distributor groove; and the axes of symmetry of the distributor groove, which lie in the cross section of the outer circumference of inner element of the profile connection run vertically to the axis of rotational symmetry of the inner element.

7. The lubricant supply system according to claim 5, in which said distributor groove is symmetrically designed, observed when projecting a view onto its cross section into a plane with the cross section of the outer element of the profile connection, and has an oval cross section.

8. The lubricant supply system according to claim 1, said outer element having profile projection and in which said second partial area also comprises at least a part of a profile gap arising from the working in of said groove into a profile projections on said outer element of the profile connection when said distributor groove is arranged in said outer element, viewed in an axial section through the outer element of the profile connection.

9. The lubricant supply system of claim 1, said outer element having profile projection and in which said second partial area of said distributor groove is coupled to one of intermediate spaces which are formed by profile gaps in the profile projections of said outer element of the profile connection and by profile gaps in the profile projections of said inner element of the profile connection; and the width of the intermediate space is greater than the width of said second partial area.

10. The lubricant supply system of claim 1, in which said distributor element includes transfer slots and is shaped such that it seals, when lubricant is being supplied, both said partial areas, against one another until the attainment of a certain, pre-defined pressure in said first partial area and when said certain pressure is attained or exceeded, said pressure frees said transfer slots between the first and the second partial areas.

11. The lubricant supply system according to claim 10, characterized in that the transfer slots have a cross-sectional area whose sum is much less than the sum of the cross-sectional areas of said lubricant supply conduits.

12. The lubricant supply system according to claim 11, characterized in that the ratio between the sum of the cross-sectional areas of said transfer slots to the sum of the cross-sectional areas of said lubricant supply conduits can be freely established by one of the selection of the material of said distributor element and the fit between said distributor element and said distributor groove.

13. The lubricant supply system of claim 1, in which said distributor groove has an essentially constant cross section in radial direction.

14. The lubricant supply system of claim 1, in which said distributor groove is divided in radial direction into two partial grooves, a first partial groove which is the outer one in radial direction and a second partial groove which is the inner one in radial direction;

said inner partial groove has, when arranged in said outer element, a larger cross section than said outer partial groove, viewed in an axial section through said outer element of the profile connection; and said distributor element is arranged in said inner partial groove.

15. The lubricant supply system according to claim 14, in which said distributor element rests on the cross-sectional transition in the inner partial groove.

16. The lubricant supply system according to claim 10, in which the width of said distributor element is selected in such a manner that it has at least the tolerance of one of a transition fit and a press fit, with the width of said distributor groove.

17. The lubricant supply system according to claim 10, in which said distributor element is designed to be elastic in its circumferential direction and rigid over its width.

18. The lubricant supply system of claim 10, in which said distributor element comprises several layers.

19. The lubricant supply system according to claim 18, in which said layers are designed so that they can move against each other in axial direction.

20. The lubricant supply system of claim 10, in which said distributor element is constructed of semifinished material.

21. The lubricant supply system according to claim 10, in which said distributor element is a band.

22. The lubricant supply system according to claim 10, in which said distributor element is formed by at least one part of a piston support ring.

23. The lubricant supply system according to claim 10, in which said distributor element is formed by at least one part of a snap ring.

24. The lubricant supply system of claim 10, in which said distributor element is formed by at least one part of an O-ring.

25. The lubricant supply system of claim 10, in which said distributor element is designed as an assembly consisting of a sealing element and a support element, said support element arranged on the inside, viewed in radial direction, when said distributor groove is arranged in said outer element, and when said distributor groove is arranged in said inner element said support element is arranged on the outside.

26. The lubricant supply system according to claim 25, in which said sealing element is elastic in radial direction.

27. The lubricant supply system according to claim 25, in which said sealing element rests in a sealing manner on said inner wall of the distributor groove;

at least a partial area of the inner surface of said sealing element, viewed in the assembled state in radial direction, stands in contact with the outer surface of said support element;

said sealing element comprises at least one passage cross section which extends, viewed in the assembled state in radial direction, from its outer surface to its inner surface; and the outer surface, viewed in the assembled state in radial direction, of the support element has a heightened roughness in comparison to the inner surface of the sealing element.

28. The lubricant supply system according to one claim 1, in which said distributor element is shaped in such a manner and coupled to said distributor groove such that transfer cross sections for lubricant are provided between said first partial area and said second partial area in the area of profile gaps formed in the profile base; and the sum of the area of said transfer cross sections is much smaller than the sum of the areas of the cross sections of said lubricant supply conduits.

29. The lubricant supply system according to claim 28, in which said transfer cross sections are formed by one of recesses and openings in said distributor element.

30. The lubricant supply system according to claim 28, in which said distributor groove in said outer element is divided in radial direction into two partial grooves, a first partial groove, the outer one in radial direction, and a second partial groove, the inner one in radial direction;

said inner partial groove has a greater cross section, viewed in an axial section through the outer element of the profile connection, than said outer partial groove; and said transfer cross sections are formed by pocket-like recesses in the area of the transition from said first to said second partial groove.

31. The lubricant supply system of claim 28, in which said distributor element is rigid in one of the circumferential direction and radial direction.

32. Lubricant supply system (1) for a profile connection (2) of a shaft (3) and of a hub (4) with the ability to transfer torque between said shaft and hub and move axially and longitudinally;

a first outer element of the profile connection, shaft or hub, surrounds another, second, inner element of the profile connection, hub or shaft, at least partially in circumferential direction;

at least one distributor groove (6) extending over at least a part of the inner circumference (5) in circumferential direction is arranged in the area of the profile base (9) on the inner circumference (5) of the outer element (4) of the profile connection (2), said distributor groove located between said first outer element and said second inner element;

the distributor groove (6) is coupled to at least one lubricant supply conduit (8) extending to the outer circumference of the outer element (4) of the profile connection (2);

characterized by the following features:

a distributor element (12) extending over the length of the distributor groove (6) in circumferential direction is arranged in the distributor groove (6);

the distributor element (12) divides the distributor groove into a first partial area located radially outside and into a second partial area located radially inside (13.1, 13.2); and the distributor element (12) and the distributor groove (6) are designed and constructed in such a manner that they form in their cooperation a plurality of valve positions between the first (13.1) and the second partial area (13.2) of the distributor groove (6).

\* \* \* \* \*